United States Patent [19]
Mazz et al.

[11] Patent Number: 5,266,787
[45] Date of Patent: Nov. 30, 1993

[54] LASER SCANNER USING TWO SCAN MOTORS INDEPENDENTLY CONTROLLED BY A SINGLE SIGNAL

[75] Inventors: Thomas Mazz, Huntington Station; Anthony Fama, Mastic; Frederick Helm, Douglaston, all of N.Y.

[73] Assignee: Symbol Technologies, Inc., Bohemia, N.Y.

[21] Appl. No.: 640,252

[22] Filed: Jan. 11, 1991

[51] Int. Cl.$^5$ .......................... G06K 7/10; H02P 5/46
[52] U.S. Cl. ..................................... 235/467; 318/68; 318/77
[58] Field of Search ................ 235/466, 454, 462, 472, 235/467; 318/67, 68, 71, 78, 77, 85, 37, 45, 46, 50; 388/804, 806, 811, 814

[56] References Cited

U.S. PATENT DOCUMENTS

| | | | |
|---|---|---|---|
| 4,251,798 | 2/1981 | Swartz et al. | 235/462 |
| 4,341,982 | 7/1982 | Lahti et al. | 318/67 X |
| 4,387,297 | 6/1983 | Swartz et al. | 235/462 |
| 4,496,831 | 1/1985 | Swartz et al. | 235/472 |
| 4,575,625 | 3/1986 | Knowles | 235/467 |
| 4,593,186 | 6/1986 | Swartz et al. | 235/472 |
| 4,661,826 | 4/1987 | Saitou | 346/76 |
| 4,709,195 | 11/1987 | Helleckson et al. | 318/254 |
| 4,829,217 | 5/1989 | Kameyama et al. | 318/67 X |
| 4,871,904 | 10/1989 | Metlisky et al. | 235/467 |
| 4,967,135 | 10/1990 | Ashikaga et al. | 318/808 |
| 4,992,717 | 2/1991 | Marwin et al. | 318/696 |
| 5,003,164 | 3/1991 | Barkan | 235/472 |
| 5,010,242 | 4/1991 | Frontino | 235/462 |
| 5,013,899 | 5/1991 | Collins, Jr. | 235/462 |
| 5,019,764 | 5/1991 | Chang | 318/627 |

Primary Examiner—Davis L. Willis
Assistant Examiner—Edward H. Sikorski

[57] ABSTRACT

A dual motor speed control circuit for providing independent speed control of two motors in a laser scanning device is disclosed herein. This apparatus utilizes a single input signal having variable frequency and duty cycle components. The speed of the first motor is controlled by utilizing the frequency component of said input signal while the speed of the second motor is controlled by utilizing the frequency and duty cycle components of said input signal. Specifically, a DC signal is generated that is dependent upon the duty cycle component of said input signal and said DC signal is utilized to offset the speed of the second motor from the speed value as determined by the frequency component of said input signal.

19 Claims, 3 Drawing Sheets

LASER SCANNER USING TWO SCAN MOTORS INDEPENDENTLY CONTROLLED BY A SINGLE SIGNAL

BACKGROUND OF THE INVENTION

1. Field of the Invention

The present invention relates to laser scanning systems for reading bar code symbols, and more particularly, to a dual motor speed controller for controlling the speed of two scanning motors in a laser scanning device.

2. Discussion of the Prior Art

The increased use of bar code symbols to identify products, particularly in retail business, has resulted in the development of various bar code reading systems and devices. Presently, many bar code reading devices are portable, hand-held laser scanning systems. The users of these devices place a premium on the size, weight, and power requirements for the devices. One such system is a laser scanning bar code reading system as described in U.S. Pat. No. 4,496,831 assigned to the same assignee as the present invention and incorporated by reference herein.

The laser scanning system disclosed in U.S. Pat. No. 4,496,831 includes a portable, hand-held scanning head which may be embodied in various shapes, one such shape being a gunshaped housing. A handle and barrel portion are provided to house the various components of the laser scanning head therein. These components include a miniature light source such as a semiconductor laser diode, a miniature optic train including focusing lenses for directing light generated from the light source across a bar code symbol, and miniature sensing means for detecting reflected light from the bar code symbol being scanned.

In operation, the miniature optic train focuses a light beam generated by the laser diode to impinge upon a scanning means, which is mounted in the light path within the barrel portion of the scanning head. The scanning means sweeps the laser beam across the bar code symbol, and comprises at least one scanning motor for sweeping the beam lengthwise across the symbol, and may comprise a second motor for sweeping the beam widthwise across the symbol. Light reflecting means such as mirrors are mounted on the shafts to direct the beam through the outlet port to the symbol. The sensing means then detects and processes the light reflected off the symbol, and generally comprises photosensitive elements such as semiconductor photodiodes.

The structural aspects of each of the scanning motors are analogous to a simplified stepper motor, except that the scanning motor is controlled by a control means which is operative to cause the shaft of the motor to oscillate first in one circumferential direction over an arc length less than 360° and secondly in the opposite circumferential direction over an arc length less than 360°, and thereafter to repeat the aforementioned cycle at a high rate of speed.

The use of two scanning motors permits multi-line and omni-directional scan patterns to be generated for scanning symbols. For instance, if both x-axis and y-axis scanning is provided, a raster-type scan pattern will be generated for scanning the bar code symbol. A Lissajous-type scanning pattern is available if both scanning motors are driven at sinusoidally-varying rates of speed. The size and shape of the pattern can be controlled by adjusting the tilt angles of the mirrors and/or the angular speeds of the scanning motors. Various scan patterns are described, for example, in U.S. Pat. Nos. 4,251,798, 4,387,297 and 4,871,904. These scan patterns may be used to scan more complex symbols such as two-dimensional bar codes or randomly-oriented symbols.

The U.S. Pat. No. 4,709,195 to R. Hellekson, et al. discloses a bar code scanner that utilizes hall effect devices to monitor the speed of the scanning motor. In particular, the output signal from one hall effect switch is used as an input to a motor detector circuit. The motor detector circuit receives a voltage proportional to the frequency (i.e., speed of the motor), compares the derived voltage to a reference voltage representative of a minimum permissible operating speed, and outputs voltage signals to indicate an overspeed or underspeed motor condition. These voltage signals are monitored by a microprocessor so appropriate action may be taken depending upon the state of the motor.

Presently there is a need for a system that can provide for the independent control of the rate of speed of two scanning motors in a laser scanning device. Moreover, a system that is capable of providing flexibility in the laser scanning patterns that can be generated from such devices is highly desirable. It is accordingly an object of the present invention to fulfill the needs mentioned by providing a dual motor speed control circuit having these desired capabilities.

The LS 9000 scanner, in which the invention is to be applied, is a "lamp type" scanner. The LS 9000 scanner will be operated in a continuous on mode. The scanning pattern will be projected down from the lamp onto a tabletop or to the floor. The actual scanning pattern will be a Lissajous-type which will allow omni-directional reading of bar codes.

To generate the Lissajous-type scanning pattern, two counter rotating motors will be used to deflect the laser beam. By changing the ratio of the speeds of the two motors various Lissajous scan patterns will be generated. The present invention provides a cost effective means for controlling motor speeds which in turn allows a number of scan patterns to be generated.

SUMMARY OF THE INVENTION

The present invention is directed to a dual motor speed control circuit for providing independent speed control of two scanning motors resident in a laser scanning system. The control circuit of the invention may be utilized to control the speed two of scanning motors in a portable scanning device such as the SL9000 laser scanner manufactured by Symbol Technologies, Inc., 116 Wilbur Place, Bohemia, N.Y. 11716, however, the principles and teachings of the present invention can be adopted and applied for use in any type of laser scanning device. The dual motor speed controller utilizes a single input signal that provides all the information needed by the laser scanner board to develop the proper scanning patterns and motor speeds, while providing more flexibility in pattern selection. To accomplish independent speed control of two motors, an input an external source—typically a microprocessor. The frequency of the input signal is utilized to establish the speed of one motor, while the information contained in the duty cycle of the input signal is used to establish the speed difference between the first motor and the second motor. The primary circuits for controlling the speed of the first motor include a counter means for generating a frequency control signal at the frequency at which the first motor is required to operate and a feedback circuit means for controlling the speed of the first motor. The primary circuits for controlling the speed of the second motor include an integrating means for generating a variable direct current voltage signal dependent upon the duty cycle of the input signal and a second feedback circuit means for controlling the speed of the second motor whereby the speed of the second motor is dependent upon the variable direct current voltage signal.

The present invention provides for a cost effective method of controlling the speeds of two motors because the number of control lines to be input to the scanner board is reduced to one. All of the information is transmitted in one signal and is later constructed into its necessary components on the laser scanner board instead of the microprocessor board. As a result, real estate on the microprocessor connector pins and wires.

DETAILED DESCRIPTION OF THE PREFERRED EMBODIMENTS

Figure 1:
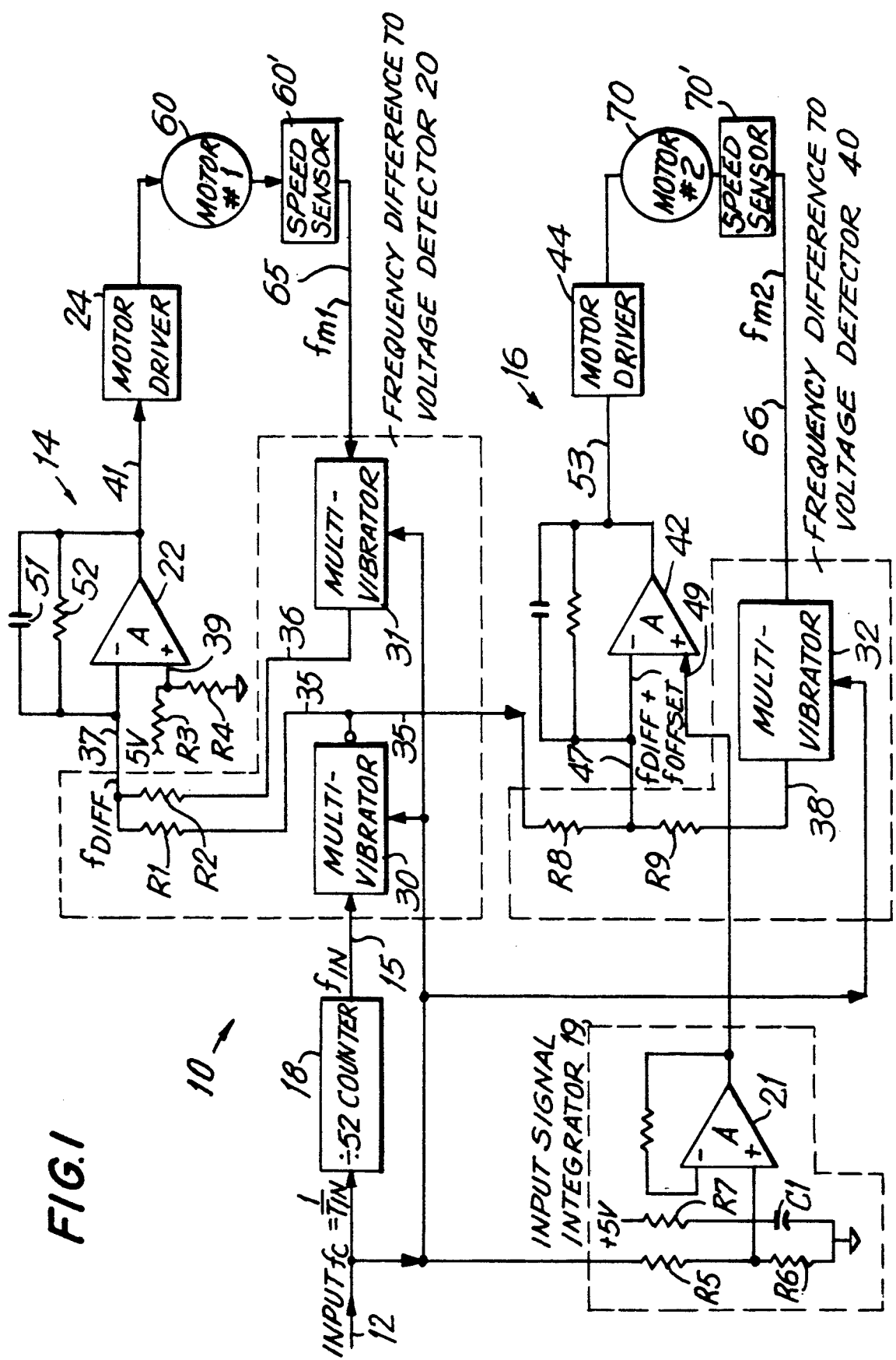
FIG. 1 is an electrical block diagram of the dual motor speed controller in accordance with this invention.
Figure 3:
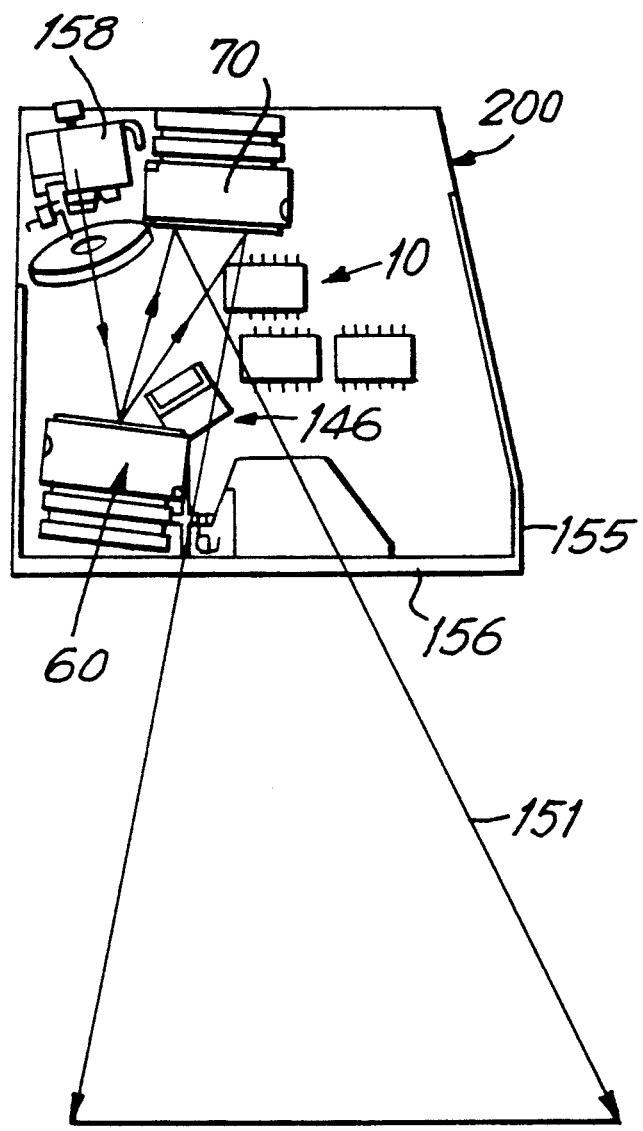
FIG. 3 is an illustration of a scanner in which the invention is applied.

Referring now to FIG. 1, reference numeral 10 identifies a dual motor speed control circuit for controlling the speed of a first motor 60 and second motor 70 in a laser scanner. An example of a hand-held laser scanning device that may incorporate the control circuit 10 is shown in FIG. 3 and will be described below in a later portion of this specification.

As shown in FIG. 1, control circuit 10 is provided with an input signal 12 which contains frequency and duty cycle components that are utilized to provide independent speed control of the first and second motors. The frequency and duty cycle components are used to determine the speed of the two motors. The dual motor speed control circuit 10 comprises a first motor control loop circuit 14 which is essentially a feedback system for controlling the speed of the first motor 60 and a second motor control loop circuit 16 which is essentially a feedback system for controlling the speed of the second motor 70. The primary circuits comprising the first motor control loop circuit 14 include: a frequency difference to voltage detector circuit 20, an amplifier/filter 22 and a motor driver 24. The primary circuits comprising the second motor control loop circuit 16 include: an integrator circuit 19, a frequency difference to voltage detector 40, an amplifier/ filter 42 and a motor driver 44. A divide-by-N counter 18 is common to both motor control loop circuits 14 and 16 of dual motor speed control circuit 10. It should be noted that FIG. 1 does not show power supply voltages or component values as they are selected to meet the requirements of a particular application.

First motor 60 and second motor 70 utilized in the dual motor speed controller 10 are both brushless DC type motors, in which the speed is directly proportional to the input drive voltage. The motors utilized in the preferred embodiments each have a pair of windings. Measurements performed on these motors have displayed speed changes from 1333 to 1900 rotations per minute/volt (RPM/volt) and gains of approximately 75 Hz/volt. The gain of 75 Hz/volt refers to the frequency change per volt of the motor control signal, fm. The frequency, fm, of the motor control signal is three times that of the motor. Step response measurements were made to approximately determine the motor response characteristics. Results of these measurements show that each of the motors respond in an exponential fashion with a time constant of 1.25 seconds. First motor 60 and second motor 70 each have a speed sensor 60', 70' associated therewith which provide motor speed sensor signals, 65 and 66 of frequency $f_{m1}$ and $f_{m2}$, respectively. Frequencies $f_{m1}$ and $f_{m2}$ are approximately three times the operating speed of the corresponding motor. This is due to the fact that the windings of the motor are alternatively turned on three times for each revolution of the motor (i.e., every 60°). The motor speed sensors are of conventional well known design that senses the voltages on the winding itself. For example, for a motor speed of 9000 RPM, the motor speed sensor signal output is 450 Hz.

In order to facilitate the understanding of the present invention, the control circuitry will be described for use with the LS 9000 scanning system, and utilizing an Intel 80c196 microcontroller. However, it should be understood that the invention is not limited to this illustrative embodiment as the teachings of the invention can be used in connection with any dual motor scanning system.

In the illustrative embodiment, the signal 12 is a digital pulse train generated from the Pulse Width Modulated (PWM) pin of the Intel 80c196 microcontroller. The PWM pin can generate a digital pulse train having a constant frequency, $f_c$, of either 23.6 kHz—corresponding to full-speed motor operation in the preferred embodiment or a frequency of 11.8 kHz—corresponding to a half-speed operating mode. The PWM pin has a variable duty cycle selection of up to 255 different duty cycles. Duty cycle selection is accomplished by writing a single byte value to the Intel microcontroller's Pulse Width Modulated Control Register. This register is dedicated to receive a single byte instruction that will change the frequency or pulse width of the digital pulse train output from the PWM pin of the microcontroller. The benefit of this feature is that a minimum of software is required and consequently valuable CPU processing time is conserved. Once a single byte value is written to this register, the processor will continue to output the same pulse train until a new value is written. This conserves the CPU time. The microcontroller can generate a large number of motor speed control patterns because of the large number of duty cycle configurations available.

In the first motor control loop circuit 14, input signal 12 having a control frequency $f_c$ and a period $T_{in}$ is input to the divide by N counter 18. In the illustrative embodiment of the present invention, N is equal to 52. The frequency control signal 15 obtained from the divide by 52 counter 18 has a frequency $f_{in}$ so that the signal frequency relations existing between the input signal 12 and frequency control signal 15 are:

$$f_c = 52 f_{in} \text{ (Hz)} \qquad (1)$$

$$1/T_c = 52 f_{in} \qquad (2)$$

$$1 = 52 f_{in} T_c \qquad (3)$$

As can be seen, the frequency of the frequency control signal 15 is proportional to the frequency of the input control signal 12 by the factor N of the divide by N counter 18. The frequency $f_{in}$ of frequency control signal 15 is equal to the frequency at which first motor 60 is required to operate.

As illustrated in FIG. 1, the frequency control signal 15 is inputted to the frequency difference to voltage detector circuit 20. The frequency difference to voltage detector circuit 20 of first motor control circuit 14 functions to determine the frequency difference between the frequency control signal 15 having a frequency $f_{in}$ and the present operating frequency of first motor 60 obtained from the first motor speed sensor signal 65 having a frequency $f_{m1}$. An output signal 37 corresponding to this frequency difference is generated therefrom.

To describe the operation of the frequency difference to voltage detector circuit 20, it is necessary to provide the details of the first and second digital multivibrators 30 and 31 respectively. Counter 30 is driven by the frequency control signal 15. When triggered, multivibrators 30 provides an inverted output signal 35 that goes low (0 volts) for 33 counts preferred embodiment of the input frequency $f_c$ and then resets high (5 volts) for 19 counts preferred embodiment of the input signal frequency $f_c$. Multivibrator 31 is driven by motor speed sensor signal 65 and provides an output signal 36 that will go high (5 volts) for 33 counts of the input frequency $f_c$ when triggered and then goes low (0 volts) for a period of time dependent upon the speed of first motor 60. The timing for the digital multivibrators 30 and 31 is provided by the input signal 12, although an external clock may be substituted. The digital multivibrator outputs 35 and 36, are combined through summing resistors R1 and R2. With R1 equal to R2, the preferred embodiment, the total effective input voltage, $v_{eff}$ to the filter amplifier 22 is:

$$V_{eff} = \frac{19 \cdot T_{in} \cdot 5}{1/f_{in}} + \frac{33 \cdot T_{in} \cdot 5}{1/f_{ml}} \text{ (volts)} \quad (4)$$

The use of unequal resistor valves would require that the input voltages 35 and 36 be weighted. The motor frequency would then be offset from the input control signal.

Equation (4) is obtained by utilizing the standard formula for determining the average value of a periodic voltage signal f(t) having period T:

$$V_{eff} = 1/T \int_0^T f(t)dt \quad (5)$$

Substituting the values to obtain the effective voltage of signal 35 we get:

$$V_{eff1} = \frac{1}{1/f_{in}} \int_{33 \cdot T_{in}}^{52 \cdot T_{in}} 5\, dt \quad (6)$$

$$V_{eff1} = \frac{1}{1/f_{in}} \cdot 19 \cdot T_{in} \cdot 5 = \frac{19 \cdot T_{in} \cdot 5}{1/f_{in}} \quad (7)$$

Likewise, obtaining the effective voltage of signal 36 results in:

$$V_{eff2} = \frac{1}{1/f_{ml}} \int_0^{33 \cdot T_{in}} 5\, dt \quad (8)$$

$$V_{eff2} = \frac{33 \cdot T_{in} \cdot 5}{1/f_{ml}} \quad (9)$$

$$V_{eff2} = \frac{33 \cdot T_{in} \cdot 5}{1/f_{ml}} \quad (10)$$

Note that $T_{in}$ as determined by input signal 12, is the same for both signals.

Adding equations (7) and (10) will get the total effective voltage $V_{eff}$ of signal 37 as shown in equation (4). $V_{eff}$ is compared to a predetermined DC voltage signal 39. The comparison is accomplished by an amplifier 22 having two input terminals and an output terminal. FIG. 1 shows signal 37 input to the negative (−) terminal of amplifier 22 and DC voltage signal 39 input to the positive (+) terminal of amplifier 22. DC voltage signal 39 is obtained by the voltage divider network comprising resistors $R_3$ and $R_4$. In the illustrative embodiment, the values of resistors $R_3$ and $R_4$ are such as to produce a DC voltage signal of 2.5 volts. The DC voltage signal 39 in effect, functions as an amplifier offset voltage. In the first motor control circuit 14, it is fixed. The effective input voltage $V_{in}$ to the amplifier 22 can be written as follows:

$$V_{in} = \frac{19 \cdot T_{in} \cdot 5}{1/f_{in}} - 2.5 + \frac{33 \cdot T_{in} \cdot 5}{1/f_{ml}} - 2.5 (V) \quad (11)$$

The effective input voltage $v_{in}$ to the amplifier, 22, is representative of the frequency differences between the desired speed of the first motor and the actual operating speed of the first motor.

The characteristics of the control loop inherent in first motor control circuit 14 are such that when $V_{in}=0$ volts, a characteristic output of a control loop summing point when a feed back signal matches the input signal, it can be shown that the frequency of the first 60 motor $f_{m1}$ corresponds exactly to the frequency $f_{in}$, of the frequency control signal 15. This is shown mathematically by the following equations:

$$V_{in} = \frac{19 \cdot T_{in} \cdot 5}{1/f_{in}} - 2.5 + \frac{33 \cdot T_{in} \cdot 5}{1/f_{ml}} - 2.5$$

$$V_{in} = 19 \cdot T_{in} \cdot 5 \cdot f_{in} + 33 \cdot T_{in} \cdot 5 \cdot f_{ml} - 5$$

With no frequency error, $V_{in}=0$, so $$f_{ml} = \frac{5 - 19 \cdot T_{in} \cdot 5 \cdot f_{in}}{33 \cdot T_{in} \cdot 5}$$

$$f_{ml} = \frac{1 - 19 \cdot T_{in} \cdot f_{in}}{33 \cdot T_{in}}$$

Substituting Eq. (3) for 1 yields:

$$f_{ml} = \frac{52 \cdot T_{in} \cdot f_{in} - 19 \cdot T_{in} \cdot f_{in}}{33 \cdot T_{in}}$$

$$= \frac{33 \cdot T_{in} \cdot f_{in}}{33 \cdot T_{in}} = f_{in}$$

Therefore, when $V_{in}=0$ volts the frequency of the first motor 60 is equal to the frequency of the frequency control signal 15. It follows that the first motor 60 will operate at the desired speed as determined by the frequency control signal 15.

The voltage gain of the amplifier 22 is fixed at 470 in the illustrative embodiment which is essentially its open-loop response for DC signals. The amplifier 22 is also configured to act as a filter by virtue of the feedback capacitor 51 and resistor 52 as shown in FIG. 1. The filter is of the low-pass configuration having a single pole set at $2 \times 10^{-3}$ Hz in the illustrative embodiment. The relatively low bandwidth is required to keep the amplifier 22 from saturating due to the 5 volt pulses coming from the output signal 37 of the frequency difference to voltage detector circuit 20. Note that the gain and filter characteristics of amplifier 22 are selected to meet the particular system requirements.

To calculate the gain in volts/Hz of the frequency difference to voltage detector circuit 20, use is made of the relation in equation (11) above setting $f_{m1}=f_{in}+f_{diff}$ where $f_{diff}$ is the frequency of signal 37 output from the frequency difference to voltage detector circuit 20 and represents the difference in frequency between the frequency control signal as represented by the output of digital multivibrator 30 (i.e., signal 35) and the frequency of the motor speed sensor signal as output from the digital multivibrator 32 (i.e., signal 36). After manipulation, the equation for $V_{in}$ follows:

$$V_{in} = 52 \cdot T_{in} \cdot 5 \cdot f_{in} + 33 \cdot T_{in} \cdot 5 \cdot f_{diff} - 5$$

Substituting Eq. (3) above $$V_{in} = 33 \cdot T_{in} \cdot 5 \cdot f_{diff}$$

Therefore the gain of the frequency difference to voltage detector 20 is:

$$\text{Gain} = \frac{V_{in}}{f_{diff}} = 33 \cdot T_{in} \cdot 5 \text{ volts/Hz} \qquad (12)$$

With an input signal 12 having a frequency $f_c=23.6$ kHz (full-speed mode), Gain=6.99 mV/Hz.

As shown in FIG. 1, the control loop of first motor control loop circuit 14 is closed by coupling the approximately unity gain motor driver 24 at the output of amplifier 22 to the input of first motor 60. First frequency error correction signal 41 is the output signal from amplifier 22. This signal 41, as determined by the effective voltage $V_{in}$ at the input terminals to amplifier 22 (see equation 11), corrects the operating speed of first motor 60. When the speed of first motor 60 corresponds exactly to the frequency of frequency control signal 15, i.e, when $V_{in}=0$, the frequency error correction signal 41 is approximately 8.0 volts DC. Any frequency difference between signals 15 and 65 will create a deviation from this nominal value. For instance, when the first motor operating speed is less than the desired first motor speed as set by frequency control signal 15, the $V_{in}$ to amplifier 22 will be greater than 0 volts. Consequently, the first frequency error correction signal 41 will be greater than the nominal 8.0 volts output and this increase will provide a corresponding increase in the speed of first motor 60. When the first motor operating speed is greater than the desired first motor speed as set by frequency control signal 15, the $V_{in}$ to amplifier 22 will be less than 0 volts, and the corresponding frequency error correction signal 41 will be less than nominal to provide the corresponding decrease in first motor operating speed. Signal 41 by itself is not suitable to drive first motor 60 so motor driver 24 provides the drive necessary for first frequency error correction signal 41 to correct the operating speed of first motor 60.

The basic components of second motor control circuit 16 as shown in FIG. 1 are essentially the same as that for the first motor with the exception that the amplifier offset voltage at the positive input terminal of amplifier 42 is adjustable. The details will be described below.

As in the first motor control loop circuit 14, the second motor control loop circuit 16 of the dual motor speed controller 10 utilizes the single input signal 12 having a control frequency $f_c$ and a period $T_{in}$. This signal is fed into the divide by 52 counter 18 having, as an output, frequency control signal 15 with a frequency, $f_{in}$, that is 52 times less than the input control frequency, $f_c$. Equation (1) above shows this relation. The frequency control signal 15 is fed into the second frequency difference to voltage detector 40. The frequency difference to voltage detector 40 of second motor control loop circuit 16 functions to determine the frequency difference between frequency control signal 15 having a frequency $f_{in}$ and the present operating frequency of second motor 70 obtained from second motor speed sensor signal 66 having a frequency $f_{m2}$. An output signal 47 corresponding to this frequency difference is also generated therefrom. It is important to realize that in this embodiment digital multivibrator 30 and frequency control signal 35 are common to the frequency difference to voltage detector circuits 20 and 40.

The frequency control signal may be removed from the circuit if desired. In addition, if digital one shot 32 is clocked by an internal clock, control loop circuit 16 will respond to input signal 12's duty cycle information only. In this case, the second motor 70 will not change speed in response to input signal 12 frequency changes if the input duty cycle is held constant.

The operating details of the second frequency difference to voltage detector 40 comprising digital multivibrators 30 and 32, are the same as that described for the first frequency difference to voltage detector 20. Digital one-shot 30 is driven by the frequency control signal 15. When triggered, digital multivibrator 30 provides the inverted output signal 35 that goes low (0 volts) for 33 counts of the input frequency $f_c$ and then is reset high (5 volts) for 19 counts of the input signal frequency $f_c$. Digital one-shot 32 is driven by motor speed sensor signal 66 and provides an output signal 38 that will go high (5 volts) for 33 counts of the input frequency $f_c$ when triggered and then low (0 volts) for a period of time dependent upon the speed of second motor 70. The timing for the digital multivibrators 30 and 32 is provided by the input signal 12. Through summing resistors $R_8$ and $R_9$ digital multivibrator output signals 35 and 38 respectively, are combined to provide a signal having a total effective voltage $V_{eff}$ similar to the one shown in equation (4).

$$V_{eff} = \frac{19 \cdot T_{in} \cdot 5}{1/f_{in}} + \frac{33 \cdot T_{in} \cdot 5}{1/f_{m2}} \text{ (volts)} \qquad (13)$$

The derivation of equation (13) follows that of equation (4) except that frequency, $f_{m2}$, corresponds to that of the second motor.

An effective input voltage, $V_{in}$ representative of the difference in speed between the desired second motor speed and the actual motor speed is obtained by comparing $V_{eff}$ to the variable offset voltage signal 49. The variable offset voltage signal is the output of signal integration circuit 19. As illustrated in FIG. 1, input signal 12 is fed into the input signal integrator 19. The input signal integrator 19 functions to convert the duty cycle of the input signal 12 into a DC signal 49. Since the duty cycle of input signal 12 is variable, the corresponding voltage of DC signal 49 will vary accordingly. The integrator circuit 19 comprises an R/C network of resistors R5, R6, R7, capacitor C1 and operational amplifier 21. Note that the values of these components are tailored to meet the requirements of the system and furthermore that the configuration of integrator circuit 19 is not limited to that as shown in FIG. 1. The output signal 49 functions as an offset voltage to amplifier 42. Its voltage value is dependent upon the duty cycle of input signal 12. This value, $V_{set}$, can be written as:

$$V_{set} = 5 \left(\tfrac{1}{2} - K\right) \text{ (volts)} \qquad (14)$$

where K is a function of the DC voltage contained in the duty cycle of the input signal 12. The value of K is generally anywhere between the range of 0 to 0.3 in the preferred embodiment. This corresponds to a range of voltages for signal 49 anywhere from 1.0 to 2.5 volts DC. For example, if $K=0$, $V_{set}$ (signal 49) would equal 2.5 volts and the speed of second motor 70 would be equal to that of the first motor. If $K=0.3$, $V_{set}$ (signal 49) would be equal to 1.0 volts DC. This would correspond to the lowest operating speed for second motor 70.

As mentioned above, $V_{eff}$ is compared to the DC voltage signal 49. This comparison is accomplished by amplifier 42 having two input terminals and an output. FIG. 1 shows signal 47 input to the negative (−) terminal of amplifier 42 by means of R9 and R8 and DC voltage signal 49 input to the positive (+) terminal of amplifier 42. The effective input voltage $V_{in}$ to the amplifier 42 can be written as:

$$V_{in} = \frac{19 \cdot T_{in} \cdot 5}{1/f_{in}} - V_{set} + \frac{33 \cdot T_{in} \cdot 5}{1/f_{m2}} - V_{set} \qquad (15)$$

The characteristics of the control loop inherent within second motor control circuit 16 are such that when there is no frequency error, $V_{in}$ of amplifier 42 equals 0 volts. Thus, setting $V_{in}=0$ in equation 15 and solving for $f_{m2}$ yields $$V_{in} = \frac{19 \cdot T_{in} \cdot 5}{1/f_{in}} - V_{set} + \frac{33 \cdot T_{in} \cdot 5}{1/f_{m2}} - V_{set} \qquad (15)$$

As can be seen from equation 16 the frequency, hence the speed, of second motor 70 is dependent on K which is related to the duty cycle of input signal 12. The speed of the second motor is also dependent on $T_{in}$. Thus, by reducing the frequency $f_c$ of input signal 12, the speed of both first motor 60 and second motor 70 will change proportionally. The effect of the factor K however, weighs greater in determining the operating speed of second motor 70.

The gain of amplifier 42 is fixed at 470 in the illustrative embodiment. Amplifier 42 also acts as a filter with a low-pass type configuration similar to that of amplifier 22. To calculate the gain of the second frequency difference to voltage detector circuit 40, use is made of the relation in equation (15) above. Setting $f_{m2}=f_{in}+f_{offset}+f_{diff}$ where $f_{offset}$ corresponds to the effect on the speed of second motor 70 due to the factor K which is dependent on the duty cycle of input signal 12, results in the following:

$$\begin{aligned} V_{in} &= 19 \cdot T_{in} \cdot 5 \cdot f_{in} - 2 \cdot (\tfrac{1}{2} - K) \cdot 5 + \\ & \quad 33 \cdot T_{in} \cdot 5 \cdot (f_{in} - f_{offset} + f_{diff}) \\ &= 52 \cdot T_{in} \cdot 5 \cdot f_{in} - 5 + 2 \cdot K \cdot 5 - 33 \cdot \\ & \quad T_{in} \cdot 5 \cdot f_{offset} + 33 \cdot T_{in} \cdot 5 \cdot f_{diff} \\ &= 2 \cdot K \cdot 5 - 33 \cdot T_{in} \cdot 5 \cdot f_{offset} + 33 \cdot T_{in} \cdot 5 \cdot f_{diff} \end{aligned}$$

When the control loop of second motor control loop circuit 16 is satisfied, then $2 \cdot K \cdot 5 = 33 \cdot T_{in} \cdot 5 \cdot f_{offset}$. Thus, $V_{in} = 33 \cdot T_{in} \cdot 5 \cdot f_{diff}$. Therefore, it follows that the gain of the second frequency difference to voltage detector 40 is $$\text{Gain} = 33 \cdot T_{in} \cdot 5 \text{ volts/Hz} \qquad (17)$$

To complete the control loop of the second motor control loop circuit 16 a second frequency error correction signal 53 is output from amplifier 42. This signal 53, as determined by the effective voltage $V_{in}$ at the input terminals to amplifier 42 (see Eq. 15), corrects the operating speed of second motor 70. Signal 53 alone is not suitable to drive second motor 70 so it is fed into motor driver circuit 44. Motor driver circuit 44 is of approximately unity gain and acts as a buffer. It provides the necessary drive for the second frequency error correction signal 53 to correct the operating speed of second motor 70.

Figure 2:
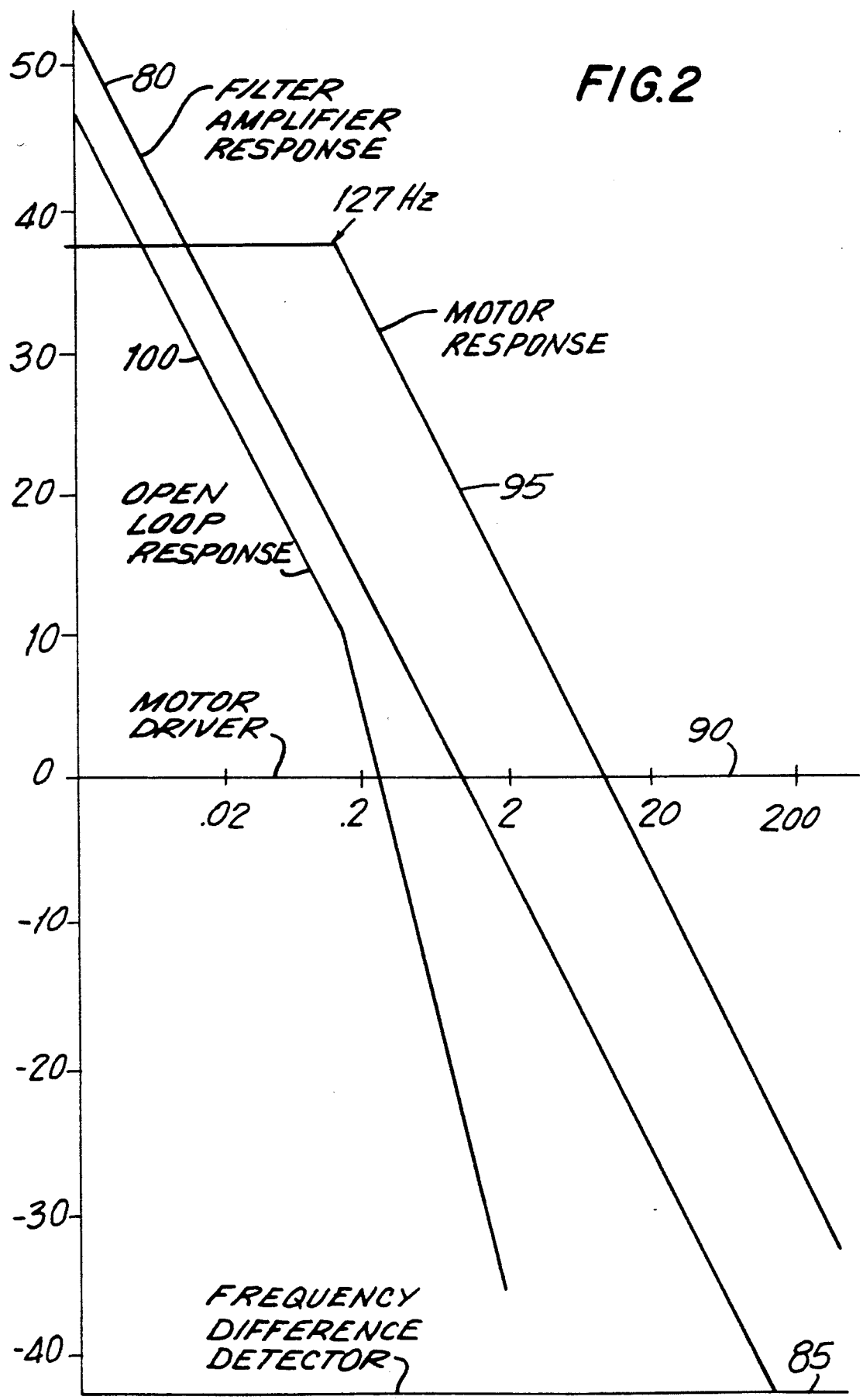
FIG. 2 is a graph of the dual speed motor controller loop response characteristics.

FIG. 2 shows a plot in decibels (dB) of the gain vs. frequency characteristics of the various components contained in the dual motor speed control circuit 10 of the illustrative embodiment. A curve for the total open loop response applicable to both first motor and second motor control loop circuits is shown as curve 100 in FIG. 2.

The amplifier frequency response curve is shown as curve 80 in FIG. 2. Curve 80 corresponds to the response of both amplifiers 22 and 42 in the dual motor speed control circuit 10. The frequency response curve of the first and second frequency difference to voltage detectors 20 and 40 is shown as curve 85 in FIG. 2. The response for motor driver circuits 24 and 44 is shown as curve 90 in FIG. 2. The open loop response for both first motor 60 and second motor 70 is shown as curve 95.

The overall loop gain for first and second motor control loop circuits 14 and 16 is calculated as follows:

$$\begin{aligned}
\text{Loop gain} &= \text{Frequency diff. to voltage detector} \\
&\quad \text{Gain} \times \text{Amplifier Gain} \times \text{Motor Driver} \\
&\quad \text{Gain} \times \text{motor gain} \\
&= 6.99 \times 10^{-3} \text{ v/Hz} \cdot 470 \cdot 1 \cdot 75 \text{ Hz/v} \\
&= 246 \\
&= 47.8 \text{ dB assuming an average motor} \\
&\quad \text{gain of 75 Hz/v}
\end{aligned}$$

It should be stressed that the gains and frequency response characteristics shown in FIG. 2 corresponds only to those of the circuit components as utilized in the preferred embodiment of the dual motor speed control circuit 10 as described above. The values and curves shown in FIG. 2 are subject to change depending upon the characteristics of the motors used or the type of control requirements desired.

The present invention may be implemented in a hand-held, laser-scanning, bar code reader unit or lamp type scanner such as the SL 9000 shown in FIG. 3. A hand-held device is disclosed in U.S. Pat. No. 4,760,248, issued to Swartz, et al., assigned to Symbol Technologies, Inc. Alternatively, or in addition, features of U.S. Pat. No. 4,387,297 issued to Swartz, et al., or U.S. Pat. No. 4,409,470 issued to Shepard, et al., both such patents assigned to Symbol Technologies, Inc., may be employed in constructing the bar code reader unit or in the SL 9000 lamp type scanner of FIG. 3. These U.S. Pat. Nos. 4,706,248, 4,387,297, and 4,409,470 are incorporated herein by reference. An outgoing light beam 151 is generated in the reader 200, usually by a laser diode or the like, and directed to impinge upon a bar code symbol a few inches from the front of the reader unit. The outgoing beam 151 is scanned over the symbol to be read. Reflected light 152 from the symbol is detected by a light-responsive device 146 in the reader unit, producing serial electrical signals to be processed for identifying the bar code. A light-weight plastic housing 155 contains the laser light source, the detector 146, and the optics and signal processing circuitry. A light-transmissive window 156 in the front end of the housing 155 allows the outgoing light beam 151 to exit and the incoming reflected light to enter.

Although the present invention has been described with respect to linear or single line bar codes, it is not limited to such embodiments, but may also be applicable to more complex scanning patterns and to stacked or two-dimensional bar codes such as Code 49 and similar symbologies. It is conceivable that the method of the present invention may also find application for use with various machine vision or optical character recognition applications in which information is derived from other types of indicia such as characteristics or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

We claim:

1. A speed control arrangement in an electro-optical scanner for reading light-reflective indicia, said scanner having first and second scan motors driven by a single common digital signal having an input frequency and a duty cycle, said motors being operative for scanning a light beam in a scan pattern over an indicium to be read, said arrangement comprising:
   (a) first control means responsive to the single common signal, for varying the speed of the first scan motor in proportion to the input frequency of the single common signal; and
   (b) second control means responsive to the single common signal, for varying the speed of the second scan motor in proportion to the input frequency and the duty cycle of the single common signal.

2. The arrangement of claim 2, wherein the first and second control means share a first input circuit means for generating a frequency control signal having a control frequency proportional to the input frequency of the common signal; and wherein the first control means includes a first control circuit for controlling the speed of the first scan motor in direct proportion to the control frequency; and wherein the second control means includes a second input circuit for generating a direct current voltage signal having a variable voltage dependent on the duty cycle, and a second control circuit for controlling the speed of the second scan motor, independently of the speed of the first scan motor, as a function of the control frequency and the direct current voltage signal.

3. The arrangement of claim 2, wherein the second input circuit means includes an integrator means for converting the common signal to the direct current voltage signal.

4. The arrangement of claim 1, wherein the common signal is a train of pulses generated by a microprocessor on-board the scanner.

5. The arrangement of claim 1, wherein the scan pattern is an omni-directional scan pattern.

6. A method of controlling first and second scan motors in an electro-optical scanner for reading light-reflective indicia, scan motors being operative for scanning a light beam in a scan pattern over an indicium to be read, said method comprising the steps of:
 (a) generating a single common signal having an input frequency and a duty cycle;
 (b) varying the speed of the first scan motor in proportion to the input frequency of the single common signal; and
 (c) varying the speed of the second scan motor in proportion to the input frequency and the duty cycle of the single common signal.

7. The method of claim 6, and further comprising the steps of generating a frequency control signal having a control frequency proportional to the input frequency of the common signal; and wherein step (b) is performed by controlling the speed of the first scan motor in direct proportion to the control frequency; and wherein step (c) is performed by generating a direct current voltage signal having a variable voltage dependent on the duty cycle, and controlling the speed of the second scan motor, independently of the speed of the first scan motor, as a function of the control frequency and the direct current voltage signal.

8. The method of claim 7, wherein the frequency control signal generating step is performed by converting the common signal to the frequency control signal whose control frequency substantially corresponds to an operating speed at which the first scan motor is required to operate.

9. The method of claim 7, wherein step (c) is further performed by converting the common signal to the direct current voltage signal.

10. A speed control arrangement in an electro-optical scanner for reading light-reflective indicia, said scanner having first and second scan motors driven by a common digital signal having an input frequency and a duty cycle, said motors being operative for scanning a light beam in a scan pattern over an indicium to be read, said arrangement comprising:
 (a) first control means responsive to the common signal, for controlling the speed of the first scan motor as a function of the input frequency of the common signal;
 (b) second control means responsive to the common signal, for controlling the speed of the second scan motor as a function of the input frequency and the duty cycle of the common signal;
 (c) said first and second control means sharing a first input circuit means for generating a frequency control signal having a control frequency proportional to the input frequency of the common signal, said first input circuit means including a counter means for converting the common signal to the frequency control signal whose control frequency substantially corresponds to an operating speed at which the first scan motor is required to operate;
 (d) said first control means including a first control circuit for controlling the speed of the first scan motor in direct proportion to the control frequency; and
 (e) said second control means including a second input circuit for generating a direct current voltage signal having a variable voltage dependent on the duty cycle, and a second control circuit for controlling the speed of the second scan motor, independently of the speed of the first scan motor, as a function of the control frequency and the direct current voltage signal.

11. The arrangement of claim 10, wherein the counter means is a divide by N counter.

12. A speed control arrangement in an electro-optical scanner for reading light-reflective indicia, said scanner having first and second scan motors driven by a common digital signal having an input frequency and a duty cycle, said motors being operative for scanning a light beam in a scan pattern over an indicium to be read, said arrangement comprising:
 (a) first control means responsive to the common signal, for controlling the speed of the first scan motor as a function of the input frequency of the common signal;
 (b) second control means responsive to the common signal, for controlling the speed of the second scan motor as a function of the input frequency and the duty cycle of the common signal;
 (c) said first and second control means sharing a first input circuit means for generating a frequency control signal having a control frequency proportional to the input frequency of the common signal;
 (d) said first control means including a first control circuit for controlling the speed of the first scan motor in direct proportion to the control frequency, said first control circuit including:
  (i) a first speed sensor means for generating a first motor speed signal having a first motor frequency proportional to an operating speed of the first scan motor,
  (ii) a first signal processor means for obtaining a first difference signal having a voltage and being representative of the frequency difference between the frequency control signal and the first motor speed signal,
  (iii) a first amplifier means for comparing the voltage of the first difference signal with a predetermined voltage of a reference signal, and for outputting a first frequency error correction signal for correcting the operating speed of the first scan motor,
  (iv) a first motor driver means coupled to the first amplifier means and the first scan motor, for converting the first frequency error correction signal into a first drive signal for the first scan motor, and
  (v) the first speed sensor means, the first signal processor means, the first amplifier means, the first motor driver means and the first scan motor all being connected in a closed feedback loop; and
 (e) said second control means including a second input circuit for generating a direct current voltage signal having a variable voltage dependent on the duty cycle, and a second control circuit for controlling the speed of the second scan motor, independently of the speed of the first scan motor, as a function of the control frequency and the direct current voltage signal.

13. The arrangement of claim 12, wherein the second control circuit includes a second speed sensor means for generating a second motor speed signal having a second motor frequency proportional to an operating speed of the second scan motor; a second signal processor means for obtaining a second difference signal having a voltage and being representative of the frequency difference between the frequency control signal and the second motor speed signal; a second amplifier means for comparing the voltage of the second difference signal with the voltage of the direct current voltage signal, and for outputting a second frequency error correction signal for correcting the operating speed of the second scan motor; and a second motor driver means coupled to the second amplifier means and the second scan motor, for converting the second frequency error correction signal into a second drive signal for the second scan motor; and wherein the second speed sensor means, the second signal processor means, the second amplifier means, the second motor driver means and the second scan motor are all connected in a closed feedback loop.

14. The arrangement of claim 4, wherein the first signal processor means includes a first pulse generating means for generating a first output signal representative of the frequency control signal; a second pulse generating means for generating a second output signal representative of the operating speed of the first scan motor; and summing means for adding the first and second output signals.

15. The arrangement of claim 14, wherein the second signal processor means includes a third pulse generating means for generating a third output signal representative of the operating speed of the second scan motor; and summing means for adding the first and third output signals.

16. The arrangement of claim 15, wherein the pulse generating means is a multivibrator.

17. The arrangement of claim 12, wherein the first frequency error correction signal is zero when the first motor frequency equals the control frequency.

18. A method of controlling first and second scan motors in an electro-optical scanner for reading light-reflective indicia, scan motors being operative for scanning a light beam in a scan pattern over an indicium to be read, said method comprising the steps of:

(a) generating a digital common signal having an input frequency and a duty cycle;
(b) controlling the speed of the first scan motor as a function of the input frequency of the common signal;
(c) controlling the speed of the second scan motor as a function of the input frequency and the duty cycle of the common signal;
(d) generating a frequency control signal having a control frequency proportional to the input frequency of the common signal;
(e) said step (b) being performed by controlling the speed of the first scan motor in direct proportion to the control frequency;
(f) said step (c) being performed by generating a direct current voltage signal having a variable voltage dependent on the duty cycle, and controlling the speed of the second scan motor, independently of the speed of the first scan motor, as a function of the control frequency and the direct current voltage signal; and
(g) said step (b) being further performed by generating a first motor speed signal having a first motor frequency proportional to an operating speed of the first scan motor, obtaining a first difference signal having a voltage and being representative of the frequency difference between the frequency control signal and the first motor speed signal, comparing the voltage of the first difference signal with a predetermined voltage of a reference signal, and outputting a first frequency error correction signal for correcting the operating speed of the first scan motor, and converting the first frequency error correction signal into a first drive signal for the first scan motor.

19. The method of claim 18, wherein step (c) is further performed by generating a second motor speed signal having a second motor frequency proportional to an operating speed of the second scan motor; obtaining a second difference signal having a voltage and being representative of the frequency different between the frequency control signal and the second motor speed signal; comparing the voltage of the second difference signal with the voltage of the direct current voltage signal, and outputting a second frequency error correction signal for correcting the operating speed of the second scan motor; and converting the second frequency error correction signal into a second drive signal for the second scan motor.

* * * * *